United States Patent [19]
Dhar

[11] Patent Number: 5,318,863
[45] Date of Patent: * Jun. 7, 1994

[54] NEAR AMBIENT, UNHUMIDIFIED SOLID POLYMER FUEL CELL

[75] Inventor: Hari P. Dhar, College Station, Tex.

[73] Assignee: BCS Technology, Inc., Bryan, Tex.

[*] Notice: The portion of the term of this patent subsequent to Sep. 7, 2010 has been disclaimed.

[21] Appl. No.: 23,589

[22] Filed: Feb. 26, 1993

Related U.S. Application Data

[63] Continuation-in-part of Ser. No. 809,581, Dec. 17, 1991, Pat. No. 5,242,764.

[51] Int. Cl.$^5$ .............................. H01M 8/10
[52] U.S. Cl. ........................ 429/30; 429/42
[58] Field of Search ..................... 429/30, 33, 42

[56] References Cited

U.S. PATENT DOCUMENTS

| | | |
|---|---|---|
| 3,498,844 | 3/1970 | Sanderson . |
| 3,507,702 | 4/1970 | Sanderson . |
| 3,528,858 | 9/1970 | Hodgdon et al. ............... 429/33 |
| 3,623,913 | 11/1971 | Adlhart et al. . |
| 3,964,930 | 6/1976 | Reiser . |
| 3,969,145 | 7/1976 | Grevstad et al. . |
| 4,192,906 | 3/1980 | Maru . |
| 4,276,355 | 6/1981 | Kothmann et al. . |
| 4,469,579 | 9/1984 | Covitch et al. . |
| 4,661,411 | 4/1987 | Martin et al. . |
| 4,769,297 | 9/1988 | Reiser et al. . |
| 4,795,536 | 1/1989 | Young et al. . |
| 4,795,683 | 1/1989 | McElroy et al. . |
| 4,797,185 | 1/1989 | Polak et al. . |
| 4,818,637 | 4/1989 | Molter et al. . |
| 4,826,741 | 5/1989 | Aldhart et al. . |
| 4,826,742 | 5/1989 | Reiser . |
| 4,876,115 | 10/1989 | Raistrick . |
| 4,988,582 | 1/1991 | Dyer . |
| 5,084,144 | 1/1992 | Reddy et al. . |
| 5,132,193 | 7/1992 | Reddy et al. ............... 429/33 X |

OTHER PUBLICATIONS

K. B. Prater, The Renaissance of the Solid Polymer Fuel Cell; Journal of Power Sources, 29 (1991), pp. 239–250.

K. B. Prater, Solid Polymer Fuel Cell Developments at Ballard, Journal of Power Sources, 37 (1992), pp. 181–188.

(List continued on next page.)

Primary Examiner—Stephen Kalafut
Attorney, Agent, or Firm—Pravel, Hewitt, Kimball & Krieger

[57] ABSTRACT

Simplified and improved solid polymer fuel cells for operation at near ambient conditions of temperature and pressure and without humidification are disclosed. In a first embodiment, a fuel cell is disclosed having two electrodes with opposing surfaces and an electrolyte comprising a solution of a proton conducting material deposited at the central portion of the surface of each electrode leaving the outer periphery of each electrode surface exposed. A slightly oversized non-conducting plastic type film having a central hole is located between and in contact with the electrodes, where its central hole surrounds and contacts the electrolyte deposits. The film is bonded with the electrodes and acts as a barrier for reactant cross-overs. In a second embodiment, the electrolyte deposit is thinner and located along the entire surface of the electrodes. A slightly oversized solid polymer electrolyte membrane is located between and is in contact with the electrolyte deposits. The membrane has a low gram equivalent weight, or is thinner but has a higher gram equivalent weight. Thus, the membrane easily transfers protons at a reduced internal electrolyte resistance, making operations possible at mild conditions without humidification.

20 Claims, 9 Drawing Sheets

OTHER PUBLICATIONS

R. Moore and C. Martin, "Morphology and Chemical Properties of the Dow Perfluorosulfonate Ionomers," Macromolecules, vol. 22, No. 9, p. 3594 (1989).

E. Ticianelli, et al., "Methods to Advance Technology of Proton Exchange Membrane Fuel Cells," J. Electrochemical Soc, vol. 135, No. 9, p. 2209 (Sep. 1988).

E. Ticianelli, et al., "Localization of Platinum in Low Catalyst Loading Electrodes to Attain High Power Densities in SPE Fuel Cells," J. Electroanalytical Chem., vol. 251, p. 275 (1988).

S. Srinivasan, et al., "Advances in Solid Polymer Electrolyte Fuel Cell Technology with Low Platinum Loading Electrodes," J. Power Sources vol. 22, p. 359 (1988).

D. Watkins, et al., "Canadian Solid Polymer Fuel Cell Development," 32nd International Power Sources Symposium, Jun. 9–12, 1986, The Electrochemical Society, Pennington, New Jersey, p. 782.

K. Prater, "The Solid Polymer Fuel Cell—A Viable Product Today," Proceedings of the 4th Canadian Hydrogen Workshop, Nov. 1–2, 1989, Canadian Hydrogen Association, Ottawa, Canada.

NEAR AMBIENT, UNHUMIDIFIED SOLID POLYMER FUEL CELL

This is a continuation-in-part of co-pending application Ser. No. 809,581, filed Dec. 17, 1991, which issued on Sept. 7, 1993 as U.S. Pat. No. 5,242,764 to Dhar, and of which benefit is claimed under Title 35 U.S.C. §120.

BACKGROUND OF THE INVENTION

1. Field of the Invention

The present invention relates to improvements of solid polymer fuel cells, otherwise referred to as solid polymer electrolyte or proton exchange membrane fuel cells, where these cells are operable at near ambient conditions of temperature and pressure and do not require external humidification.

2. Description of Related Art

Fuel cells are typically used as a source of primary power in remote areas where the usual sources of power are unavailable and where service and maintenance of equipment is limited. Fuel cells may also be used as an alternative power source in earth and space applications. Examples in this area are unattended communications repeaters, navigational aids, space flights and weather and oceanographic stations. For such applications, the power system must be self-contained and the reliability of the system is of maximum importance.

Generally, a fuel cell is a device which converts the energy of a chemical reaction into electricity. It differs from a battery in that the fuel and oxidant are stored external to the cell, which can generate power as long as the fuel and oxidant are supplied. A fuel cell produces an electromotive force by bringing the fuel and oxidant into contact with two suitable electrodes and an electrolyte. A fuel, such as hydrogen gas, for example, is introduced at a first electrode where it reacts electrochemically in the presence of the electrolyte to produce electrons and protons in the first electrode. The electrons are circulated from the first electrode to a second electrode through an electrical circuit connected between the electrodes. Protons pass through the electrolyte to the second electrode. Simultaneously, an oxidant, such as oxygen gas or air, is introduced to the second electrode where the oxidant reacts electrochemically in presence of the electrolyte consuming the electrons circulated through the electrical circuit and the protons at the second electrode. The first electrode may alternatively be referred to as an oxidizing or as a fuel electrode, and the second electrode may alternatively be referred to as an oxidant or as a reducing electrode. The halfcell reactions at the two electrodes are, respectively, as follows:

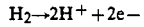

$$H_2 \rightarrow 2H^+ + 2e^-$$

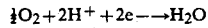

$$\tfrac{1}{2}O_2 + 2H^+ + 2e^- \rightarrow H_2O$$

The external electrical circuit withdraws electrical current and thus receives electrical power from the cell. The overall fuel cell reaction produces electrical energy which is the sum of the separate halfcell reactions written above. A byproduct of the reaction is formed as well as some heat.

In practice, fuel cells are not operated as single units; rather, they are connected in a series, stacked one on top of the other, or placed side by side. A series of fuel cells, referred to as a fuel cell stack, is normally enclosed in a housing. The fuel and oxidant are directed with manifolds to the electrodes, and cooling is provided either by the reactants or by a cooling medium. Also within the stack are current collectors, cell-to-cell seals, insulations, piping, and instrumentation. The stack, housing, and associated hardware make up the fuel cell module.

Fuel cells may be classified by the type of electrolyte, i.e., liquid or solid that they contain. A fuel cell using a solid electrolyte, such as a solid polymer referred to as a proton exchange membrane, operates best when the electrolyte membrane is kept moist with water because the membrane will not operate efficiently when it is dry. The membrane requires constant humidification during operation of the fuel cell, normally by adding water to the reactant gases, usually hydrogen and oxygen, that pass by the membrane on each side of the membrane/electrodes assembly. The accessories required for humidification add instrumentation and hence weight to the fuel cell.

The proton exchange membrane used in a solid polymer fuel cell acts as the electrolyte as well as a barrier for preventing the mixing of the reactant gases. An example of a suitable membrane is a copolymeric perfluorocarbon material containing a basic unit of fluorinated carbon chain and a sulphonic acid group. There may be variations in the molecular configurations of this membrane. One membrane commonly used as a fuel cell solid electrolyte is a well known perfluorocarbon material sold by E. I. DuPont de Nemours under the trademark "Nafion." Dow Chemicals Company has also developed proton exchange membranes that are still in the experimental stage. Excellent performances are obtained using these membranes if the fuel cells are operated under fully hydrated, essentially water-saturated conditions. As such, the membrane must be continuously humidified.

In addition to the humidification problem, the membrane contributes to the ohmic resistance within the cell itself and, in turn, lowers fuel cell performance. If the fuel cell must perform at a lower temperature and pressure and if the reaction kinetics of the two halfcell reactions shown above are slower, the use of less membrane as the electrolyte becomes imperative.

Cooling and humidification requirements increase the cost and complexity of the fuel cell, reducing its use as an alternative energy supply in many applications. Accordingly, there is a need for a fuel cell with no requirement for humidification which operates at near ambient conditions.

SUMMARY OF THE INVENTION

A fuel cell according to the present invention is an improvement upon solid polymer electrolyte fuel cells, where the solid electrolyte comprises a membrane having a central hole so that the membrane does not need the humidification of the prior art, thus allowing for less complicated and lighter modules.

One embodiment of the invention provides a fuel cell for generating electricity from a reaction between a fuel source and an oxidant source, the fuel cell comprising: a first porous gas diffusion electrode; a second porous gas diffusion electrode, the second electrode defining an electric field with the first electrode; a first electrolyte deposit placed on the first electrode; a second electrolyte deposit placed on the second electrode; and an electrolyte membrane positioned between and in contact with the first and second electrolyte deposit, the membrane having a central hole.

According to a more specific embodiment, the first and second electrolyte deposit comprises a perfluorocarbon copolymer proton conducting material.

According to a further embodiment, the first and second electrolyte deposit in the dry state comprises about 10 to 20 mg per about 5 $cm^2$ electrode area of about a 5% concentrated solution of Nafion. A 5% concentrated solution is defined as 5 grams of solid per 100 ml of solvent. The solvent is preferably a lower aliphatic alcohol such as ethanol or isopropanol, or their mixtures.

According to yet another embodiment of the invention, the electrolyte membrane comprises a perfluorocarbon copolymer proton conducting material.

According to still a further embodiment of the invention, there is provided a fuel cell comprising: a fuel or oxidizing electrode and an oxidant or reducing electrode; an electrolyte member between and in contact with the fuel electrode and the oxidant electrode, the electrolyte member defining a first and second electrolyte deposit on opposing surfaces of the electrodes; an electrolyte membrane sheet, having a central hole, positioned between and on the periphery of the deposits; a fuel distribution member in flow communication with the oxidizing electrode for supplying fuel thereto; and an oxidant distribution member in flow communication with the reducing electrode for supplying an oxidant thereto. The fuels are supplied in liquid form, or alternatively, in gaseous form.

A small amount of electrolyte deposit on an electrode allows for operation under much reduced ohmic resistance. In addition, the electrolyte deposit forms resilient layer on the electrode surface. A reduced ohmic resistance compensates for the kinetic advantage that is obtainable for the above two halfcell reactions at a higher temperature and pressure. Thus, the fuel cell operation becomes feasible at a lower temperature and pressure.

The above conditions allow the electrolyte to retain sufficient water that is formed by the electrochemical reaction during fuel cell operation allowing a continuous cell performance without membrane failure.

Experience with the fuel cells implemented as described above has led to further understanding of the working principle of near ambient, unhumidified solid polymer fuel cells, and to further improvements and operating conditions for such fuel cells. Consequently, an improvement of the previous embodiments is achieved by replacing the solid polymer membrane by a much cheaper plastic-type material, otherwise referenced to as a gasket. Furthermore, it was discovered that a continuous electrolyte membrane which has an increased inherent ionic conductivity, that is, reduced ohmic resistivity, functions in a near ambient fuel cell with little or no electrolyte deposits on the electrodes. The fuel cell performs better than that with an electrolyte having a lesser ionic conductivity if the electrolyte deposits have an increased ionic conductivity. Thus, improvements are achieved by using a continuous uncut membrane without a central hole having an increased proton conductivity, or which is thin enough to present less resistivity to proton conduction.

In one improved embodiment according to the present invention, two fuel cell electrodes, having been catalyzed by a mixture of platinum and carbon, are coated with a solution of a solid polymer electrolyte or a solution of a mixture of solid polymer electrolytes. The amount of deposits should be sufficient to prevent cross-overs of reactants when the electrodes are assembled in a fuel cell. The electrolyte is not applied around the periphery of the electrodes. Further, a non-conducting film is used as a gasket which bonds well with the electrodes, the catalysts and the electrolyte deposits. The non-conducting film has the central part cut out, so that when assembled with the two electrodes, the proton transfer occurs from the first to the second electrode. This approach provides several advantages, including a significant reduction in the amount of solid electrolyte material and the use of a significantly cheaper gasket.

In another improved embodiment according to the present invention, a solid polymer electrolyte membrane without a central hole is placed between two gas diffusion electrodes, onto which a thin coating of a solution of a solid polymer electrolyte has been applied. The purpose of the thin coating is to increase the three dimensional reaction zone of the platinum-on-carbon catalyst of the electrode. The solid polymer membrane should be sufficiently thin enough to keep itself moist with the water produced in the fuel cell reaction, so that it functions without external humidification. Or, the solid polymer membrane should have a low enough equivalent weight so that the membrane has inherently more protons per unit weight in its structure and thus functions as a medium for proton transfer in the fuel cell reaction. The gram equivalent weight of a substance is defined as the weight of a substance in units of grams which will react with one gram of hydrogen. Thus, the lower the equivalent weight of a substance, the more protons it has per unit weight.

BRIEF DESCRIPTION OF THE DRAWINGS

The accompanying drawings, which are incorporated in and form a part of the specification, illustrate the embodiments of the present invention, and, together with the description, serve to explain the principles of the invention. It is to be noted that the drawings illustrate only typical embodiments of the invention and are therefore not be to considered limiting of its scope, for the invention will admit to other equally effective embodiments. In the drawings.

DETAILED DESCRIPTION OF THE PREFERRED EMBODIMENTS

Figure 1:
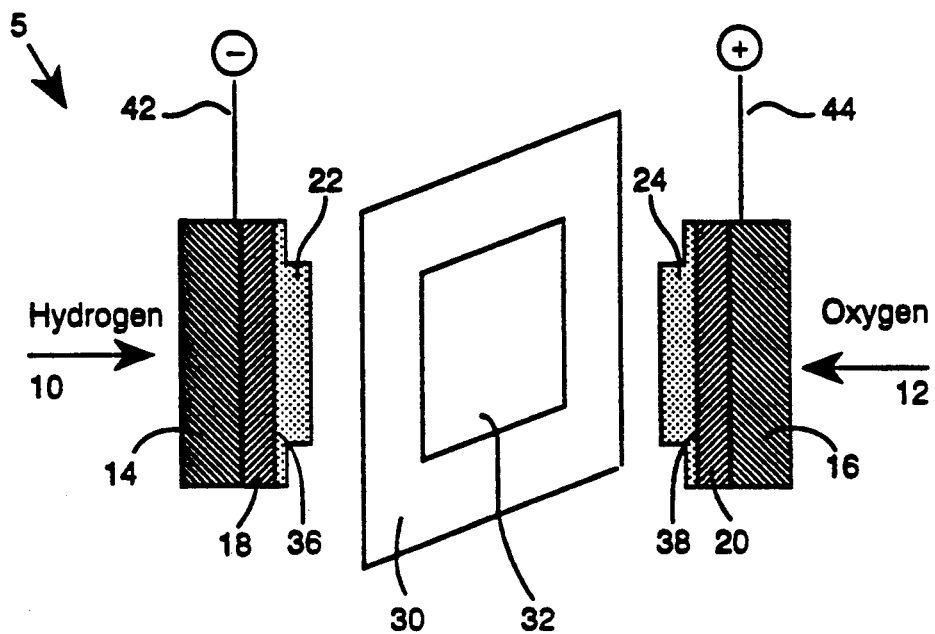
FIG. 1 is a schematic cross-section of an embodiment of the invention in which a fuel cell is provided having two electrodes and a membrane with a central hole.
Figure 2:
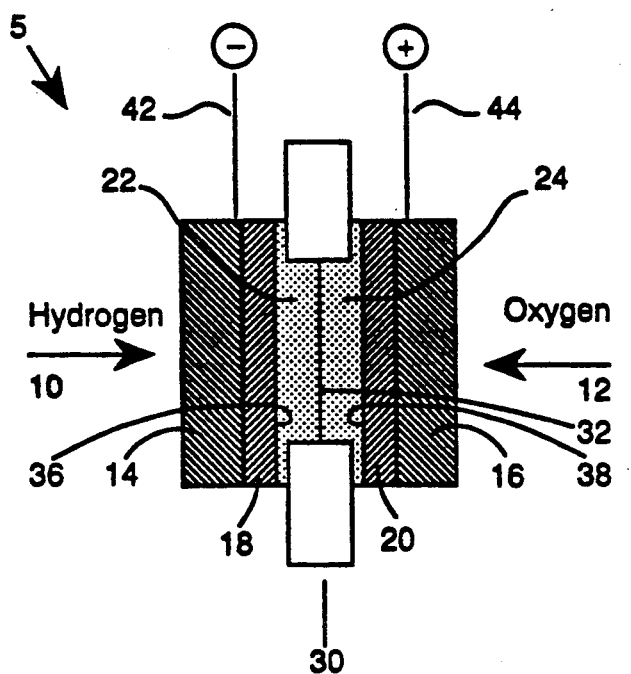
FIG. 2 is a schematic cross-section of the membrane and electrodes assembly of FIG. 1.

Referring to FIGS. 1 and 2, there is shown in schematic cross-section a fuel cell having features of the present invention. Fuel cell assembly (5) includes gaseous reactants which include a fuel source (10) and an oxidizer source (12). The gases (10) and (12) diffuse through anode backing layer (14) and cathode backing layer (16), respectively, to porous electrodes forming an oxidizing electrode or anode (18) and a reducing electrode or cathode (20), which are otherwise referred to as the electrodes (18) and (20). The electrodes (18) and (20) have deposits of solid electrolyte (22) and (24). These electrolyte deposits (22) and (24), together with an oversized membrane (30) positioned therebetween with a hole (32), separate the anode (18) and the cathode (20). Anode connection (42) and cathode connection (44) are used to interconnect with an external circuit (not shown) or with other fuel cell assemblies. A membrane/electrodes assembly is prepared by putting the components shown in FIG. 2 together and pressing for about 90 seconds at a pressure of about 1,000 psig and at a temperature of about 130° C.

The above temperature and pressure conditions ensure that the two electrodes (18) and (20) and the electrolyte deposits (22) and (24) are in good contact with each other and with the membrane (30) when preparing the membrane/electrodes assembly. The membrane (30) undergoes some deformation so that its thickness, to a certain extent, and the amount of deposits (22) and (24) are of less importance for securing a good contact between electrodes (18) and (20), electrolyte deposits (22) and (24) and the membrane (30). The ionic component of the fuel cell current, that is, the transfer of protons from the hydrogen electrode to the oxygen electrode, primarily occurs through the central hole (32) due to the reduced internal resistance of the electrolyte deposits (22) and (24). A very small amount of the ionic current can also transfer through the portion of the membrane (30) that is in contact with the electrolyte deposits (22) and (24).

Suitable fuel sources (10) that are consumed by assemblies made in accordance with the invention in order to produce electrical energy are hydrogen-containing materials (for example, water, methane, and methanol). According to some embodiments, the fuels are supplied to the assemblies in liquid form, while according to alternative embodiments, fuels are supplied in gaseous form. According to still further embodiments, hydrogen is obtained from reversible metal hydride formers, (for example, $LaNi_5$, FeTi and $MnNi_{4.15}Fe_{0.85}$, where Mm is a mischmetal, among others).

Furthermore, many suitable oxidizer sources (12) or oxidizer species are available for combining with the fuel to provide a mixture suitable for powering the fuel cell assemblies described herein. In practice, the most common oxidizer is gaseous oxygen or air.

The anode (18) and the cathode (20) halfcell hydrogen and oxygen reactions preferably include catalysts to proceed at useful rates. As such, thin catalyst layers (36) and (38) are placed on the first electrode catalyst side and the second electrode catalyst side. Various materials are suitable for forming such catalyst layers. These materials include iridium, platinum, palladium, gold, nickel, and various alloys of these materials. Other suitable catalytic materials include non-metals, (for example, electronically conducting mixed oxides with a spinel or perovskite structure). According to a more specific embodiment, the hydrogen electrode catalyst applied to the anode (18) is platinum, and the oxygen electrode catalyst applied to the cathode (20) is either platinum or another oxygen reducing catalyst (for example, a macrocyclic chelate compound). The amount of catalyst used in one embodiment is about 1 mg platinum per $cm^2$ of electrode area. It is foreseen that increasing the platinum loading or the efficiency of platinum utilization in the electrodes will improve the fuel cell performance.

According to one embodiment of the invention, a perfluorinated sulfonic acid copolymer known under the trademark Nafion and available from E.I. DuPont de Nemours was used as the electrolyte deposits (22) and (24) on the electrode. Nonetheless, any perfluorocarbon copolymer that could be used as an electrolyte membrane in a solid polymer fuel cell, such as those made by Dow Chemicals Company, is equally suitable as deposits (22) and (24) and also as the membrane (30). In particular, in one embodiment the membrane (30) was Nafion 117 having a thickness of about 175 μm. The electrolyte deposit can be made of a material that is characterized by a high conductivity for hydrogen ions ($H^+$) or hydronium ions ($H_3O^+$). Additionally, each electrolyte deposit is permeable to the fuel, to the oxidizer, and to the products of the reaction between the fuel and the oxidizer. Further, each electrolyte deposit constitutes an electron insulator, with a resistivity of at least about $10^6$ ohm-centimeters. Moreover, the solid electrolyte used to form the electrolyte deposits (22) and (24) is capable of being made in very thin layers, often below one micrometer (μm) in thickness. Selected hydrated aluminum oxides (for example, pseudoboehmite), which possesses the required hydrogen ion conductivity, electronic resistivity, and permeability to fuel, oxidizer, and products of the reaction between them, are also acceptable.

The amount of electrolyte deposit that is to be made on an electrode should be sufficient to prevent reactant cross-overs through the electrodes. According to one embodiment, the amount of electrolyte used for the electrolyte deposits (22) and (24) is in the range of about 10 mg to 20 mg per about 5 $cm^2$ electrode area. The exact thickness of the deposit was not determined; however, the deposit is thicker at the central part of the electrode than it is around the electrode edges. According to the same embodiment, the electrolyte deposit was made from a 5% concentrated solution of Nafion 117. A 5% concentrated solution is 5 grams of solid, such as Nafion 117, per 100 ml of solvent. The solvent is preferably a lower aliphatic alcohol, such as ethanol or isopropanol, or their mixtures, where 10% of the solvent comprises water. This solution is preferably placed in a closed container heated in the temperature range of about 200°-300° C. for a period of about two to five hours. The solution is preferably applied to the catalyst layers (36) and (38) of the electrodes (18) and (20) by successive coatings made with a small brush. After each coating is applied, the electrodes (18) and (20) are heated in an oven of about 80° C. for about fifteen to twenty minutes and weighed until a required amount of solid electrolyte is deposited onto the electrode surface. The deposited layers of electrolyte thus attaches to the catalyst layers (36) and (38) of the electrodes (18) and (20). The use of Nafion as a solid polymer electrolyte membrane is more particularly described in U.S. Pat. No. 4,469,579, the disclosure of which is incorporated herein by reference.

Embodiments of the present invention also include a slightly oversized solid electrolyte membrane (30), positioned between and in contact with the electrolyte deposits (22) and (24), with the central part cut out. The purpose of the hole (32) in the membrane is to avoid an additional electrolyte on top of the deposited layer and hence to avoid an unnecessary increase in the electrolyte resistance. The purpose of the oversized membrane is for gasketting the perimeter of the electrodes (18) and (20) and preventing reactant cross-overs around the electrodes. Examples of suitable membranes include Nafion and any other proton exchange membrane suitable for solid polymer fuel cell work. Moreover, any gasketting material that can effectively attach to the electrode perimeter and act as a barrier between the hydrogen and oxygen gases would be suitable instead of a proton exchange membrane.

It is believed that the fuel cell performance varies proportionately with the ratio of the area of the cutout portion of the membrane (30) to the total electrode area. This ratio determines the area of an electrode having the least resistive electrolyte pathway. For a small electrode fuel cell having a cutout portion area of 2.25 $cm^2$ and a total electrode area of 5 $cm^2$, this ratio is 45%. This would mean that the area of the electrode (18) and (20) covered by the membrane (30) was 2.75 $cm^2$, or a membrane 0.37 cm wide all around the perimeter of an electrode. If the width of the membrane (30) is kept the same (0.37 cm) for a bigger electrode fuel cell, the effective electrode area would be greater for that electrode. It can be calculated that for a 25 $cm^2$ electrode, the ratio is 73%, and for a 100 $cm^2$ electrode, 86%. Therefore, it is expected that for a larger electrode area, the fuel cell performance will improve. If the width of the membrane (30) is changed for a larger fuel cell, this calculation should be modified accordingly.

As is usual in fuel cell experiments involving solid polymer electrolytes, an initial period of conditioning for a fuel cell is allowed. The initial performance for the fuel cell is low; however, the voltage and current of the cell gradually increase upon running the cell for some period of time. This conditioning can be done at a temperature of about 30° to 40° C., polarizing the cell for a period of about 1 to 5 days.

The practice of the invention requires no additional humidification of the electrolyte or the reactants. Therefore, the water generated by the fuel cell reaction is not carried away from the electrolyte by a high flow of reactants through the fuel cell or through operation of the cell at high temperature. The preferable conditions for fuel cell operation are thus near stoichiometric flow of the reactants and substantially ambient temperature of the fuel cell.

The following examples are introduced to illustrate further the novelty and utility of the present invention but not With the intention of unduly limiting the same.

EXAMPLE 1

Figure 3:
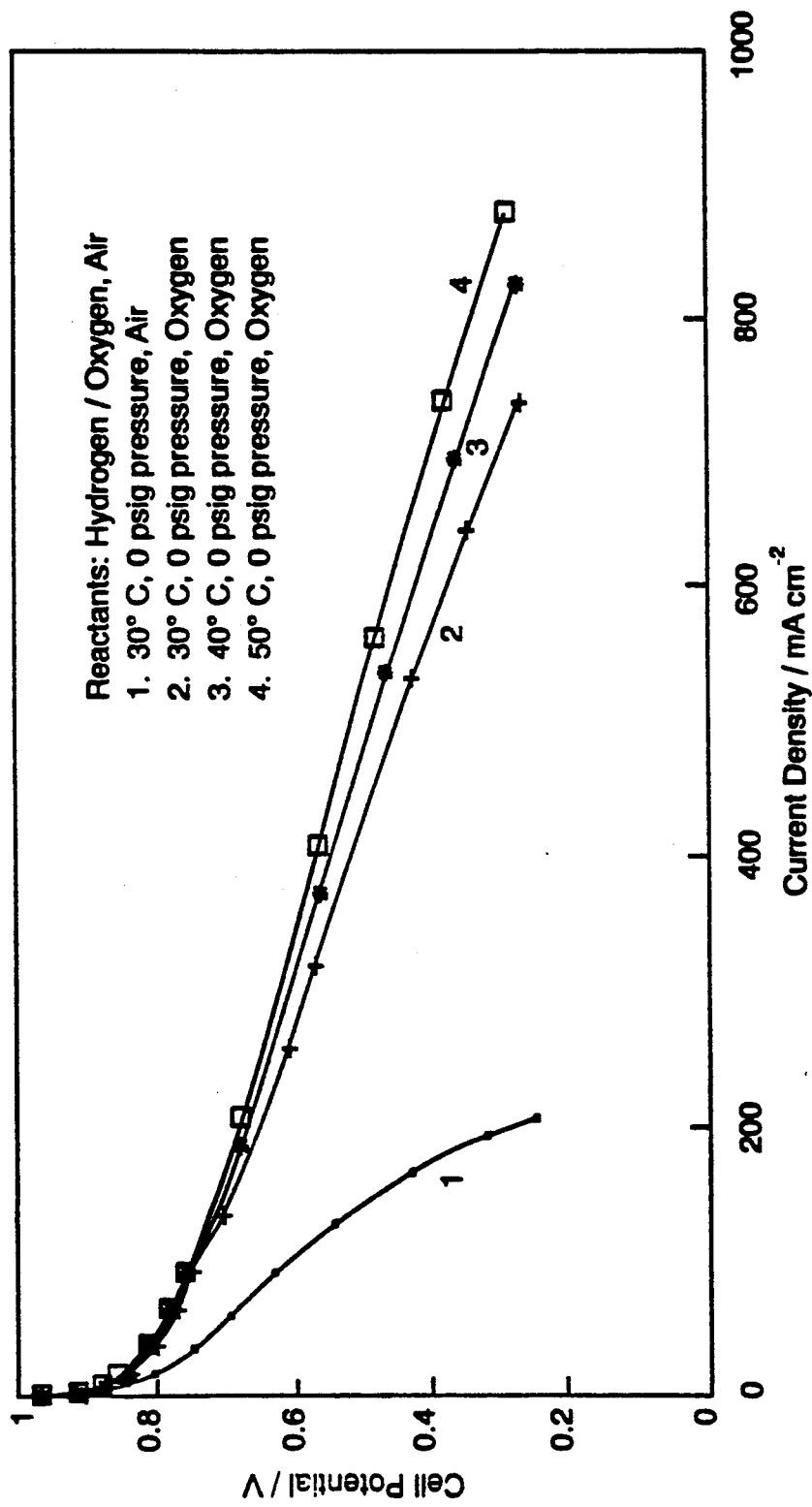
FIG. 3 is a graph of cell potential versus current density comparing a fuel cell at various temperatures and with various oxidants.

The graph in FIG. 3 shows the performance of a fuel cell in the form of a current-potential plot for a fuel cell using electrodes obtained from E-Tek, Inc. of Framingham, Mass. The catalyst is 20% platinum-on-carbon having a loading of 1 mg platinum per $cm^2$ of electrode. The electrode area for the anode and the cathode is 5 $cm^2$ each. The membrane was made of Nafion 117 of thickness 175 µm, and the solid electrolyte deposit was made of Nafion 117. The amount of electrolyte in the dry state deposited on each electrode was 15 mg. The fuel cell as described above was conditioned for three days before collection of the performance data. The gas flow for the hydrogen and oxygen was maintained near stoichiometric to the current drawn, approximately 1.1 to the stoichiometric current. No humidification was provided either for cell conditioning or for data collection. The results are presented at three temperatures, 30° C., 40° C. and 50° C. Both hydrogen and oxygen entered separate channels through the bottom of the cell and the unreacted excess exited through channels at the top. Approximately 4 inches of water back pressure was maintained for both gases. As expected, the cell performance increased with increasing temperature. At 50° C. and 300 mA/$cm^2$ of current, the cell voltage was 0.655 V, while at 30° C. and under similar conditions of current, the cell voltage was 0.615 V.

This fuel cell was also run with air as the oxidant at 30° C. To compensate for lower oxygen content, the air flow volume was maintained five times that for the stoichiometric flow of oxygen alone. The air performance is also shown in FIG. 3. Since a high flow of a reactant tends to evaporate the generated water in the fuel cell quickly, the use of air as an oxidant at a higher temperature is not preferred at atmospheric pressure. However, it is foreseen that the use of air is feasible, if the cell is operating at a lower temperature and higher pressure.

EXAMPLE 2

Figure 4:
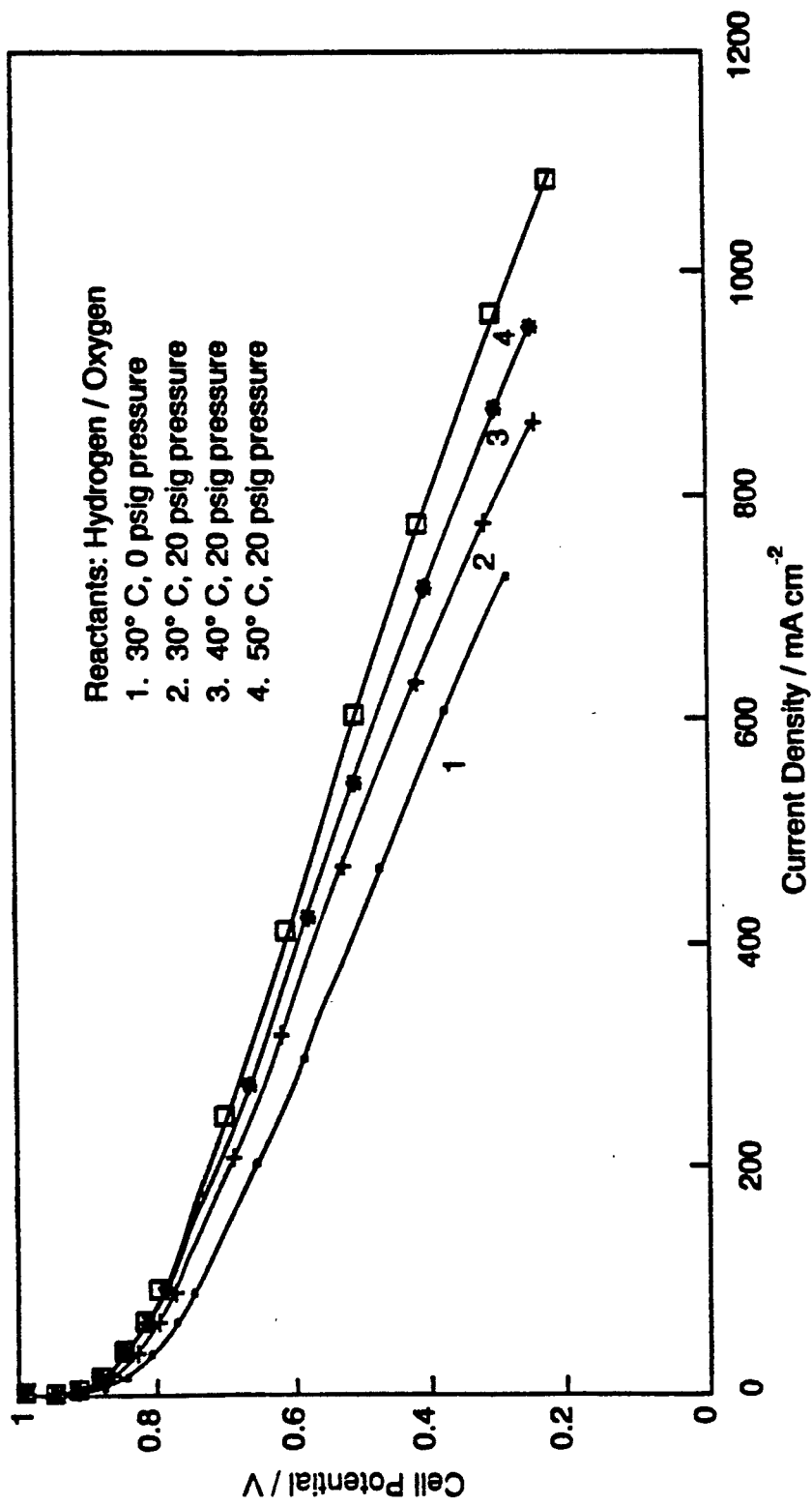
FIG. 4 is a graph of cell potential versus current density comparing a fuel cell at various temperatures and pressures.

Referring now to FIG. 4, there is a graph which shows temperature and pressure effects on fuel cell performance of a cell assembled with electrodes having electrolyte deposits of 19 and 20 mg, respectively. Other conditions for cell assembly and operation were similar to that described above. Curves 1 and 2 show the effect of increasing pressure from 0 to 20 psig for both hydrogen and oxygen gases and the cell temperature of 30° C. With increasing pressure of 20 psig, the cell performance at 300 mA/$cm^2$ increases from 0.59 V to 0.64 V. Curves 2, 3, and 4 show temperature effect at the high pressure of 20 psig. At 50° C., and 300 mA/$cm^2$ current density, the cell voltage was 0.68 volts, an improvement of 25 millivolts over the 0 psig data of FIG. 3.

According to a further embodiment of the invention, 10 mg of electrolyte was deposited on each electrode. The cell performance at 30° C. and 300 mA/$cm^2$ current density was 0.59 V and at 50° C. and the same current as above, the cell performance was 0.655 V.

Referring now to FIG. 5($a$), a schematic cross-section of an alternative embodiment according to the present invention is shown. A fuel cell assembly (50) is provided, where similar components as those of the fuel cell (5) assume identical reference numerals. In particular, the fuel cell assembly (50) also includes a fuel source (10) and an oxidizer source (12) which diffuse through an anode backing layer (14) and a cathode backing layer (16), respectively, to porous electrodes forming an anode (18) and a cathode (20). Thin catalyst layers (36) and (38) are applied on the exposed surfaces of the electrodes (18) and (20), respectively, preferably in a similar manner and using similar materials as described for the fuel cell assembly (5). The amount of catalyst is preferably approximately 0.5 mg platinum per $cm^2$ of electrode area. The electrodes (18) and (20) have deposits of solid electrolytes (52) and (54), respectively, where these electrolyte deposits (52) and (54), together with an oversized non-conducting gasket (60) positioned therebetween with a hole (62) separate the anode (18) and the cathode (20).

The electrolyte deposits (52) and (54) comprise similar materials and are applied in a similar manner as described for the fuel cell assembly (5), except that no electrolyte material is deposited at the respective peripheries (40) of the electrodes (18) and (20). Also, the amount of the electrolyte deposits (52) and (54) is preferably about the same as the electrolyte deposits (22) and (24) for the fuel cell assembly (5), having a thickness roughly uniform near the central portions (56) of the electrodes (18) and (20), but which gradually decrease at an outer location (58) between the central portion (56) and the periphery (40) of each of the electrodes (18) and (20). The exposed peripheries (40) of the electrodes (18) and (20), which are lined with the catalyst layers (36) and (38), preferably combine with the gasket (60) through hydrophobic-hydrophobic interaction when the fuel cell (50) is assembled. However, the present invention is not limited to any particular type of interaction with the gasket (60), as long as a bond occurs between the gasket (60) and the electrodes (18) and (20) along the peripheries (40).

The components of the fuel cell assembly (50) are combined together to make a single unit by inserting them between two platens of a press that is preheated to about 135° C., keeping the components there for about three minutes, and then pressing at a pressure of about 775 psig for 30 seconds. FIG. 5(b) is a side view of the fuel cell assembly (50) of FIG. 5(a) after being assembled. This assembly procedure ensures that the two electrodes (18) and (20) along with their electrolyte deposits (52) and (54) are in good contact with each other and with the gasket (60). The low internal ohmic resistance of the electrolyte deposits (52) and (54), and the non-conducting nature of the gasket (60) allow the ionic component of the fuel cell current to flow entirely through the central hole (62). The operation of the fuel cell assembly (50) is achieved near ambient conditions and without humidification.

The amount of electrolyte to form the electrolyte deposits (52) and (54) should be sufficient to prevent reactant cross-overs through the electrodes (18) and (20). The amount of electrolyte deposit is preferably in the range of about 15 mg to 20 mg per about 5 $cm^2$ electrode area, although the exact thickness of the deposit was not directly measured. The electrolyte deposits (52) and (54) are preferably made from a 50:50 mixture of 5% concentrated solution of Nafion 117 and Nafion 105. The solvent is preferably ethanol or isopropanol, or their mixtures, although it could be any other similar and suitable solvent. Nafion 117 has an equivalent weight of approximately 1100 grams and its solution has a much higher viscosity than a solution of Nafion 105. Nafion 105 has an equivalent weight of approximately 1,000 grams. The low viscosity solution of Nafion 105 when applied to an electrode tends to penetrate the catalyst layers (36) and (38) to the back of the electrodes (18) and (20). When this penetration occurs, the diffusion characteristics of the electrodes (18) and (20) are hampered: they becomes less diffusive. Therefore, a compromise was made by mixing Nafion 117 and Nafion 105 solution in the 50:50 ratio. The solution is preferably applied to the catalyst layers (36) and of the electrodes (18) and (20) by successive coatings in a similar manner as described for the fuel cell assembly (5), and as further described in U.S. Pat. No. 4,469,579.

The non-conducting gasket (60) is slightly oversized and positioned between and in contact with the electrolyte deposits (52) and (54). The purpose of the hole (62) is to allow the flow an ionic current between the two electrolyte deposits (52) and (54). The hole (62) determines the active area of the fuel cell assembly (50). The size of the gasket (60), as well as the size of the central hole (62), are similar to that described for the membrane (30) for the fuel cell assembly (5). The gasket (60) preferably comprises polypropylene film obtained from Solvay Industrial Films, Incorporated, Baltimore, Md. The film is known as ALKORPROP 81. Another material found suitable is Mylar®. Mylar® is a plastic polymeric material with the chemical composition of polymethyl methacrylate. Other suitable materials which could also be used are polymeric materials, such as polyester, polyethylene, polyvinyl, polytetrafluoroethylene, polyimide film, Nylon® tape, acetate film tape, cellophane tape, etc.

It is preferred that these polymeric materials are stable at the temperature of 120° to 140° C., the range at which the solid polymer electrolyte on the electrodes (18) and (20) combine with each other. These materials should preferably bond with the catalyst layers (36) and (38). The catalyst layers (36) and (38) preferably comprise platinum-on-carbon, which is preferably mixed with polytetrafluoroethylene powder. Therefore, the catalyst layers (36) and (38) combine with the non-conducting gasket (60) at the locations (58) and the peripheries (40), effectively forming a bond surrounding the electrolyte deposits (52) and (54), as clearly shown in FIG. 5(b). In the solid polymer electrolyte, the polymeric unit has both hydrophilic and hydrophobic chemical units. The hydrophobic component of the solid polymer establishes bonding with the non-conducting gasket (60). ALKORPROP 81 is known to show slight shrinkage at the temperature range of 120°-140° C. during the exposure time of about 15 minutes. Therefore, the exposure time in assembling the components of the fuel cell assembly (50) is set at 3 minutes. No shrinkage problem was encountered at the temperature of 135° C. A slight shrinkage could be conveniently utilized for better bonding of the gasket (60) with catalyst layers (36) and (38) at peripheries (40), and electrolyte layers at locations (58). The shrinkage temperature of Mylar® obtained from Labelon Corporation of Canadaigua, N.Y., was above 150° C.

Figure 6A:
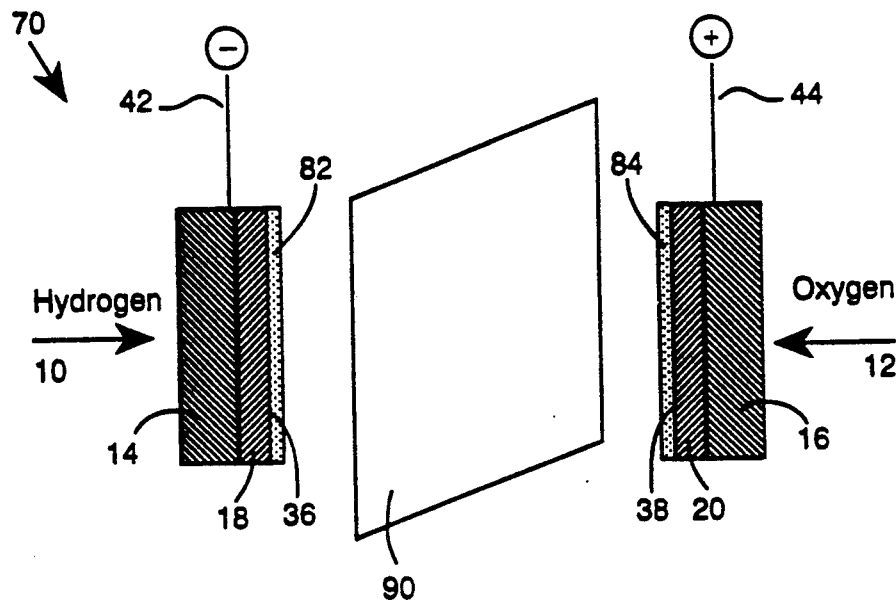
FIG. 6(a) is a schematic cross-section of another alternative embodiment of the invention in which a fuel cell is provided with having two electrodes and a continuous membrane that may be thin or thick, or that may have a high or low equivalent weight.

Referring now to FIG. 6(a), a schematic cross-section of an alternative embodiment according to the present invention is shown. A fuel cell assembly (70) is provided, where similar components as those of the fuel cell assembly (5) assume identical reference numerals.

Thin catalyst layers (36) and (38) are applied in a similar manner as described previously for the fuel cell assembly (50). Electrolyte deposits (82) and (84), together with an oversized membrane (90) are positioned between and separate the anode (18) and the cathode (20). The electrolyte deposits (82) and (84) are preferably made of the same type of materials as described for the electrolyte deposits (22) and (24) for the fuel cell assembly (5). However, the amount of deposit used is preferably between 1 mg to 6 mg per 5 $cm^2$ electrode area, and is placed relatively evenly along the entire surfaces of the respective electrodes (18) and (20).

The membrane (90) preferably comprises similar materials described for the membrane (30) of the fuel cell assembly (5). However, the membrane (90) preferably has a low gram equivalent weight of about 1,000 grams or less and preferably has a thickness of about 125 $\mu$m or less. More particularly, the membrane (90) preferably has a gram equivalent weight of about 800–1,000 grams and a thickness of about 125 $\mu$m. Alternatively, the membrane (90) may have a higher gram equivalent weight of about 1100 grams, but should be thinner, preferably having a thickness of about 50–100 $\mu$m. Again, a membrane having a lower equivalent weight has a higher density of protons in its molecular structure, and thus more easily transfers protons at a reduced internal ohmic resistance. If the membrane (90) has a higher equivalent weight, it should be thinner for it to operate at a reduced ohmic resistance to easily transfer protons between the two electrodes. These conditions allow the fuel cell assembly (70) to operate at near ambient conditions of temperature and pressure without requiring humidification of the solid electrolyte.

Figure 5A:
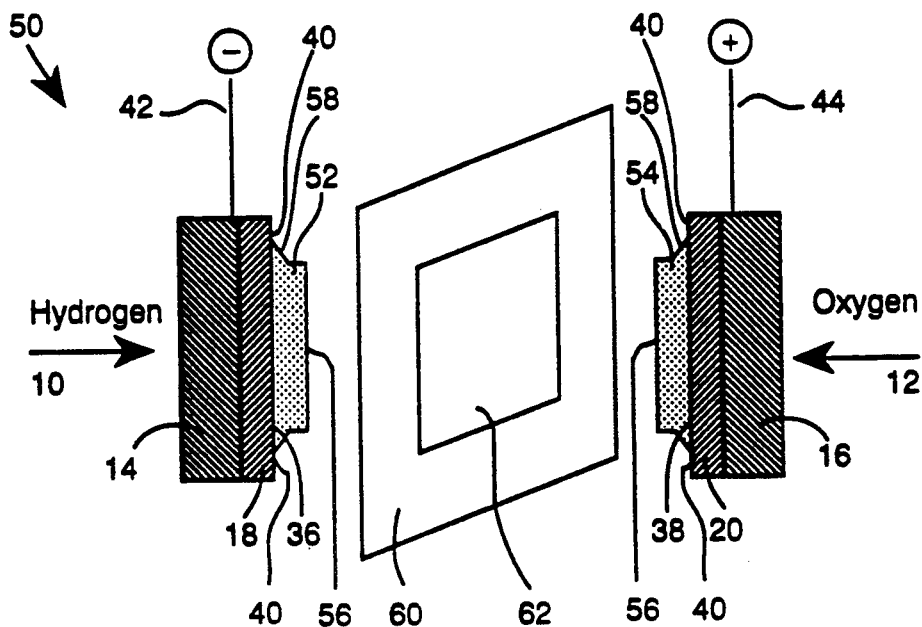
FIG. 5(a) is a schematic cross-section of an alternative embodiment in which a fuel cell is provided having two electrodes and a non-conducting gasketting material with a central hole.
Figure 5B:
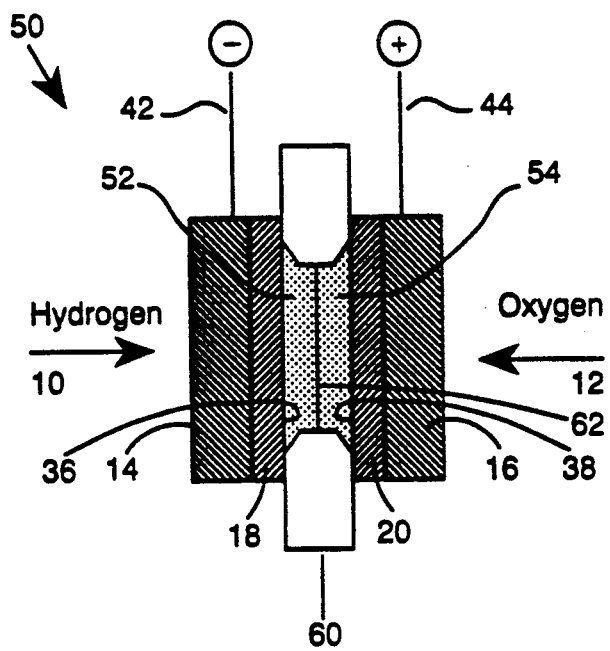
FIG. 5(b) is a side view of the fuel cell of FIG. 5(a) after being assembled.
Figure 6B:
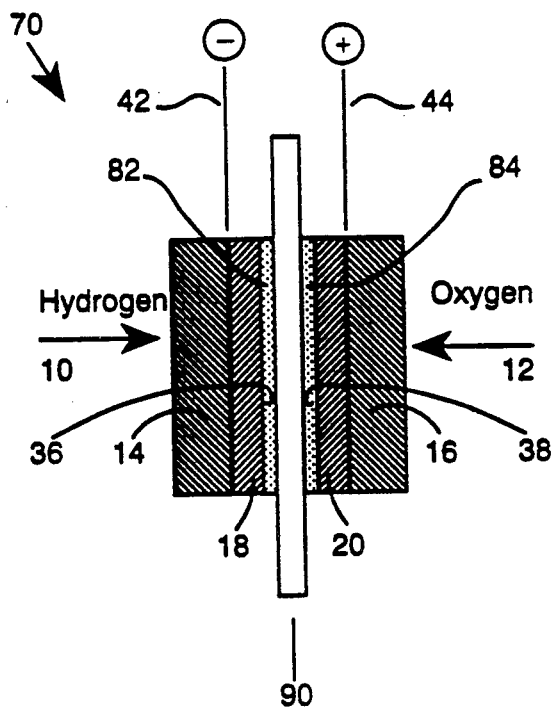
FIG. 6(b) is a side view of the fuel cell of FIG. 6(a) after being assembled.

The components are assembled in a similar manner as that described for FIGS. 5(a) and 5(b), so that the electrolyte deposits (82) and (84) are in good contact with the membrane (90). FIG. 6(b) is a side view of the fuel cell assembly (70) of FIG. 6(a) after being assembled. The low internal ohmic resistance of the membrane (90), because of its low equivalent weight and less thickness, offers less ohmic resistance to the ionic component of the fuel cell current, and thus ionic current transfer occurs through the entire membrane (90) that is in contact with the electrolytes (82) and (84).

The improved embodiments including the fuel cell assemblies (50) and (70) require no additional humidification of the electrolyte or the reactants. Therefore, the water generated by the fuel cell reaction is not carried away from the electrolyte by a high flow of reactants through the fuel cell or through operation of the cell at high temperature. The preferable conditions for fuel cell operation are thus near stoichiometric flow of the reactants and substantially ambient temperature of the fuel cell.

The following examples are introduced to illustrate further the novelty and utility of the present invention but not with the intention of unduly limiting the same. Again, the initial conditioning of the respective fuel cells is desired for proper performance as described previously, and the operation requires no additional humidification of the electrolyte or the reactants.

EXAMPLE 3

Figure 7:
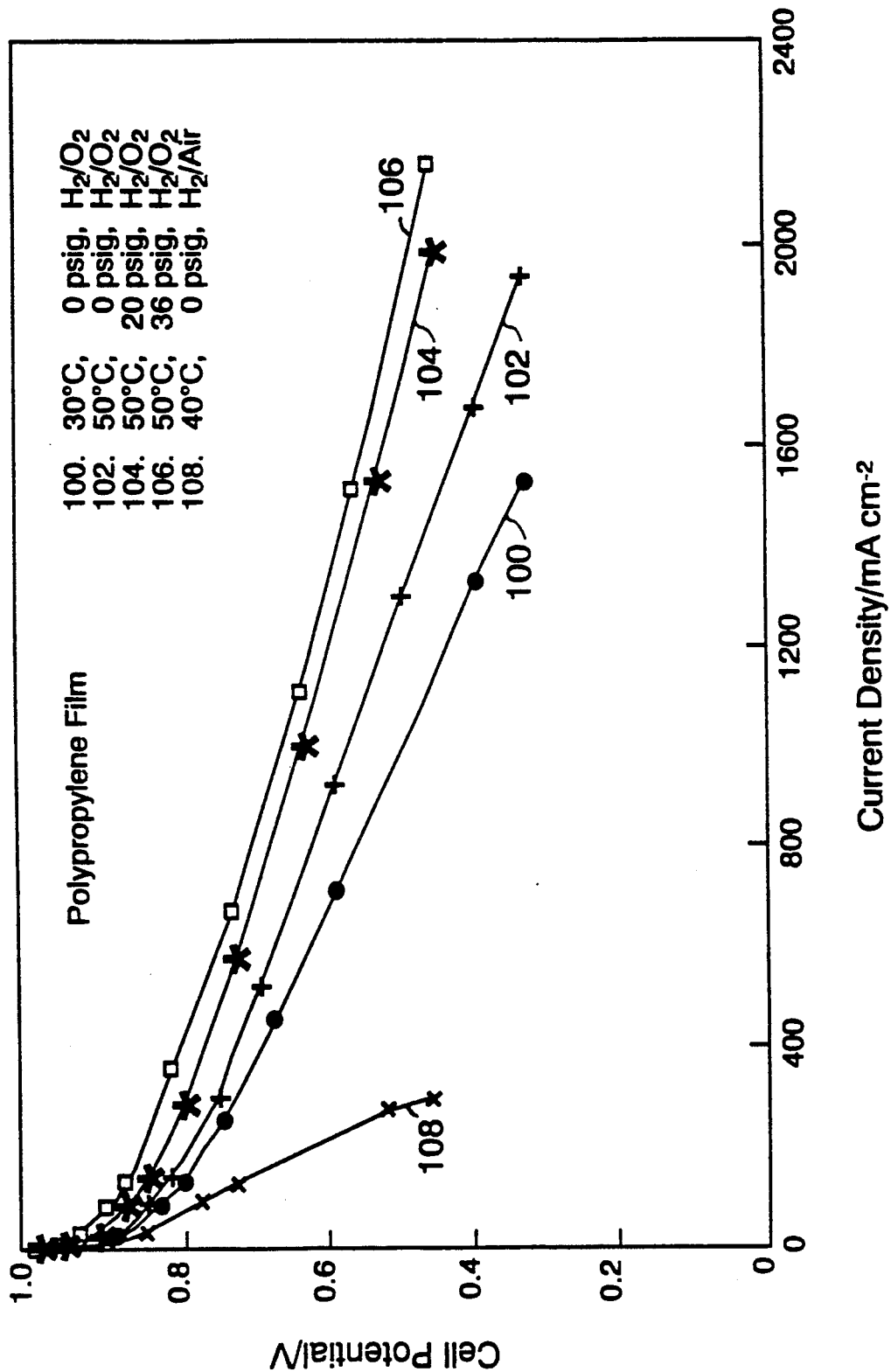
FIG. 7 is a graph of cell potential versus current density using a fuel cell according to FIG. 5(b) at various temperatures and pressures.

Referring to FIG. 7, a graph is shown illustrating the performance in the form of current-potential plot for a fuel cell according to the fuel cell assembly (50) using electrodes obtained from E-Tek, Incorporated, of Framingham, Mass. The catalyst is 20% platinum-on-carbon having a loading of 0.5 mg platinum per $cm^2$ of the electrode. The area for the anode and the cathode is 5 $cm^2$ each. The amount of electrolyte in the dry state deposited on each electrode was about 18 mg.

The first coating of electrolyte was made with Nafion 105 depositing about 2 mg in the electrode. The second coating was made with a 50:50 mixture of solutions Nafion 117 and Nafion 105. The third coating was with Nafion 117. The subsequent coatings were made with a 50:50 mixture of Nafion 117 and Nafion 105, until approximately 18 mg of electrolyte was deposited.

A polypropylene film of thickness 70 $\mu$m having a cutout area of 2.25 $cm^2$ at the center was used to make the fuel cell assembly. The fuel cell was conditioned for four days before collection of performance data. The gas flow for the hydrogen and oxygen was maintained near stoichiometric to the current drawn—about 1.1 to 1.2 to the stoichiometric current. No humidification was provided either for cell conditioning or for data collection. The results are presented at 30° and 50° C. and at 0, 20 and 36 psig pressures for both reactants. At 30° C. and 300 mA/$cm^2$ of current and 0 psig pressure as shown by curve 100, the cell voltage is 0.71 V; the corresponding performance at 50° C. is 0.74 V as shown by curve 102; and the corresponding performances at 50° C., 20 and 36 psig pressures are 0.78 and 0.81 V, respectively, as shown by curves 104 and 106, respectively.

The fuel cell was also run with air as the oxidant. To compensate for the lower oxygen content, the air flow volume was maintained five times that for the stoichiometric flow of oxygen alone. The air performance is also shown by curve 108 in FIG. 7.

The stability test of this fuel cell at 20 psig pressure and at the current density of 1 A/$cm^2$ showed that no voltage loss occurred during seven days of fuel cell operation with oxygen as the oxidant. The cell voltage remained constant at about 0.6 V.

EXAMPLE 4

Figure 8:
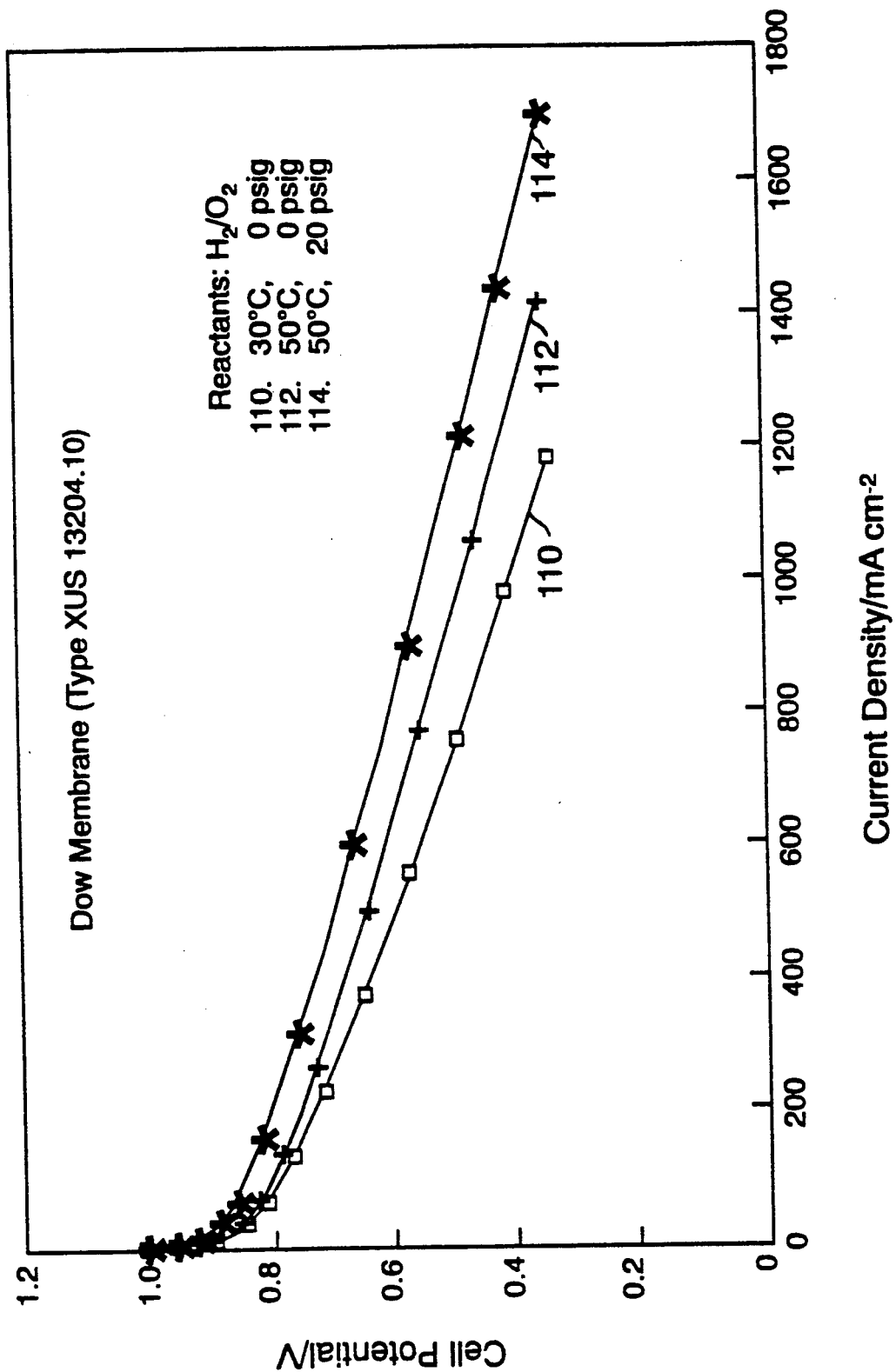
FIG. 8 is a graph of cell potential versus current density using a fuel cell according to FIG. 6(b) at two temperatures and pressures.

Referring to FIG. 8, a graph is shown illustrating temperature and pressure effects on performance of a fuel cell assembled in accordance with the fuel cell assembly (70) of FIGS. 6(a) and 6(b) with electrodes having platinum-on-carbon catalyst of about 2 mg/$cm^2$. The electrodes were first coated with about 6 mg of Nafion 105 in the dry state. The membrane used was a Dow membrane (type XUS 13204.10) of about 100 $\mu$m thickness, having an equivalent weight of about 800. The membrane was used in the uncut form without a central hole. The fuel cell was conditioned for one day. Curves 110 and 112 show the effects of increasing the temperature from 30° to 50° C. at 0 psig pressure. At the current density of 300 mA/$cm^2$, the cell voltage increased from 0.68 V to 0.73 V. Curves 112 and 114 show the effects of increasing pressure from 0 to 20 psig at 50° C. At the current density of 300 mA/$cm^2$, the cell voltage increased from 0.73 V to 0.77 V.

EXAMPLE 5

Figure 9:
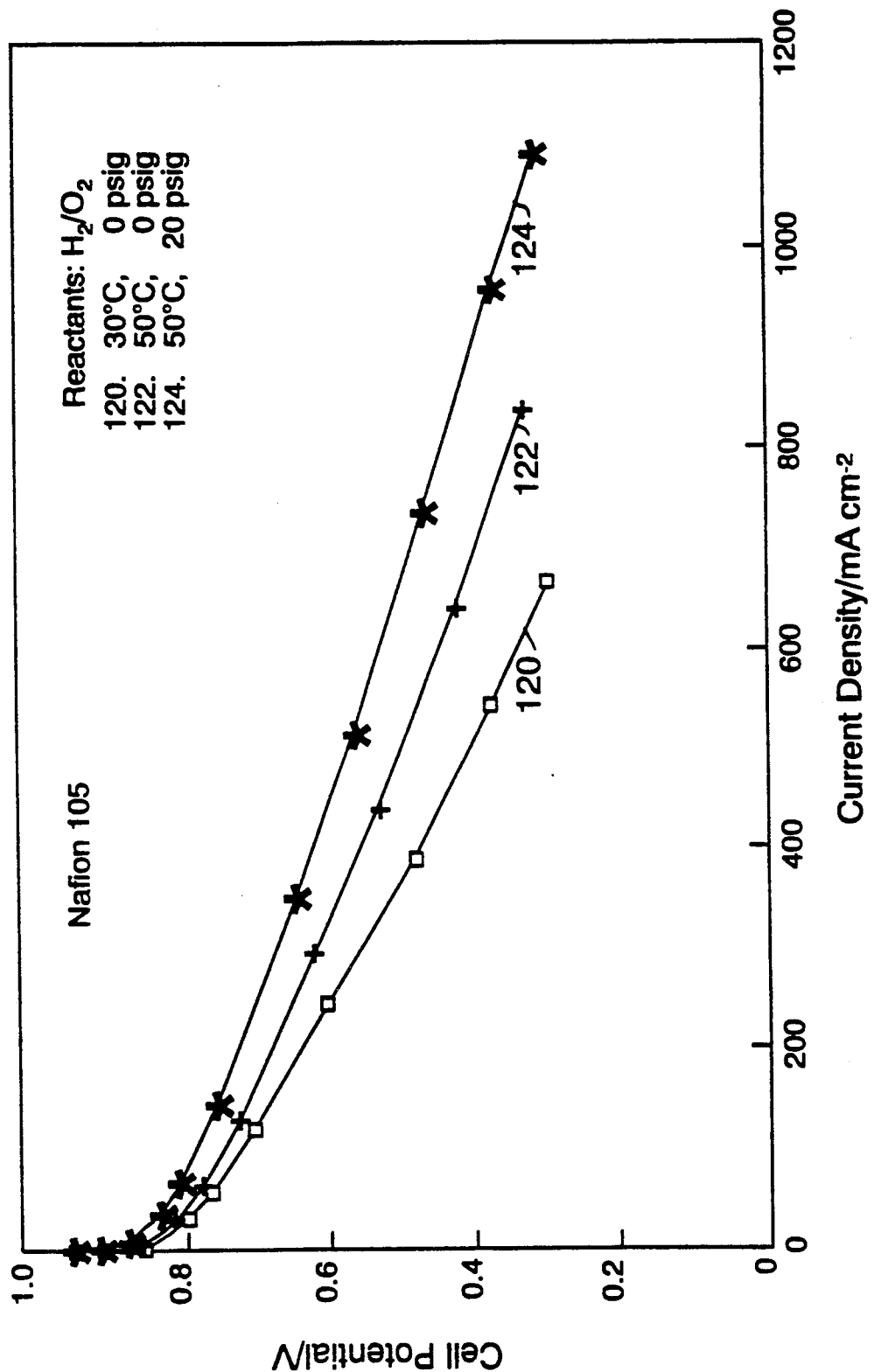
FIG. 9 is a graph of cell potential versus current density of a fuel cell according to FIG. 6(b) at two temperatures and pressures.

Referring to FIG. 9, a graph is shown illustrating temperature and pressure effects on performance of a fuel cell assembled according to the fuel cell assembly (70) with electrodes having platinum-on-carbon catalyst. The catalyst loading is about 1 mg platinum per $cm^2$ of the electrode. Each electrode was first coated with about 4 mg of Nafion 105 in the dry state. Nafion 105 of thickness 125 $\mu$m was used as the electrolyte membrane in the fuel cell. The membrane was a continuous uncut piece that separated the electrodes of the fuel cell. No humidification was provided to the cell. The fuel cell was conditioned for four days before collection of data. Curves 120 and 122 show the effects of increasing temperature from 30° to 50° C. on fuel cell performance at 0 psig pressure. Curves 122 and 124 show the effects of increasing pressure from 0 to 20 psig at 50° C. At the constant current of 300 mA/cm$^2$, 30° C. and 0 psig pressure, the cell voltage was 0.55 V. At 50° C. and 0 psig pressure, the cell voltage was 0.62 V, and at 50° C and 20 psig pressure, the cell voltage was 0.67 V.

EXAMPLE 6

Figure 10:
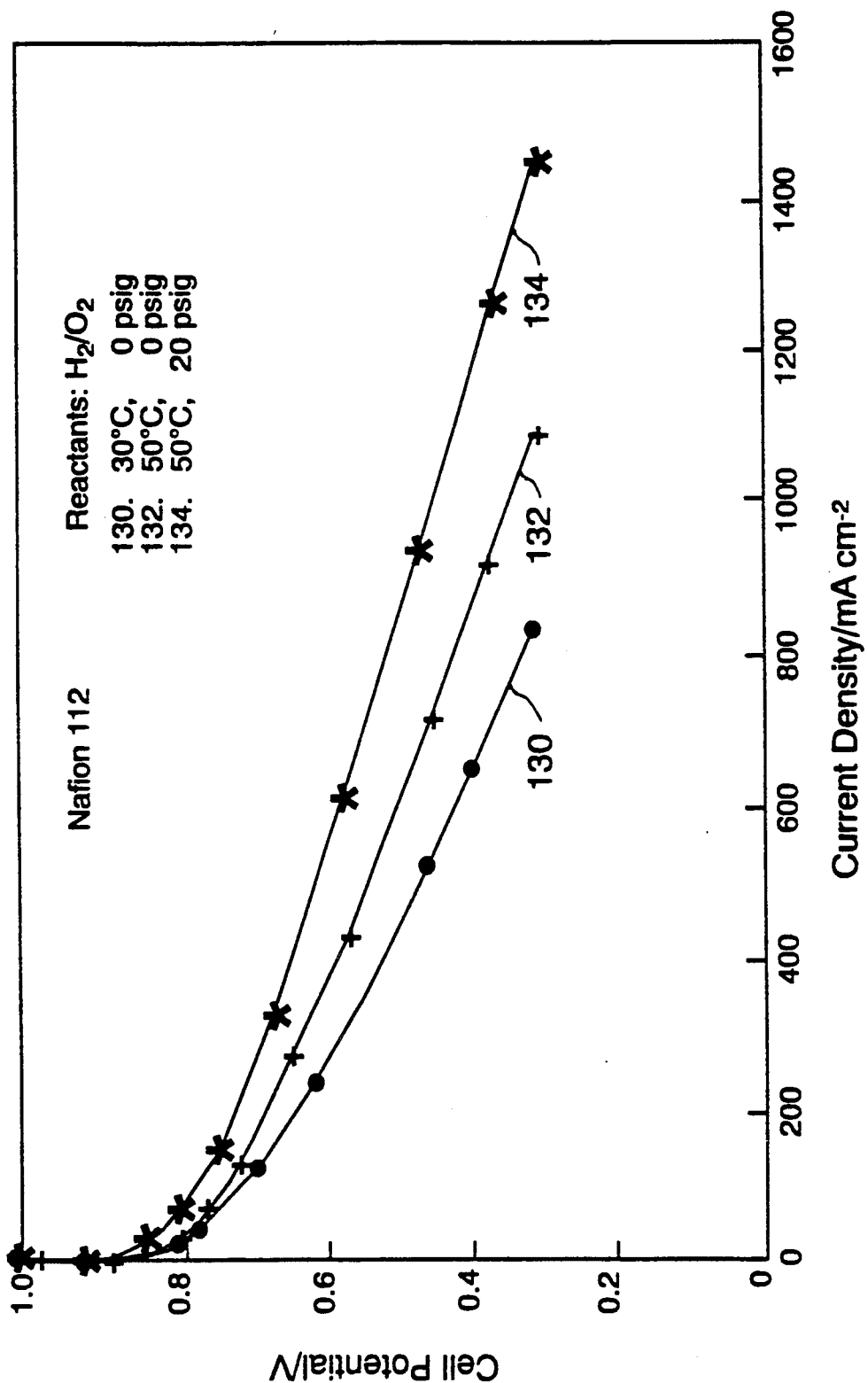
FIG. 10 is a graph of cell potential versus current density of a fuel cell according to FIG. 6(b) at two temperatures and pressures.

Referring to FIG. 10, a graph is shown which illustrates the temperature and pressure effects on performance of a fuel cell assembled according to the fuel cell assembly (70) with electrodes having platinum-on-carbon catalyst. The platinum loading is about 0.5 mg per cm$^2$ of the electrode. Each electrode was first coated with about 2 mg of Nafion 105 in the dry state. Nafion 112 of thickness 50 μm was used as the electrolyte membrane in the fuel cell. The membrane was an oversized piece without any central hole. No humidification was provided to the cell. The fuel cell was conditioned for two days before collection of data. Curves 130 and 132 show the effects of increasing the temperature from 30° to 50° C. on fuel cell performance at 0 psig pressure. At the current density of 300 mA/cm$^2$, the cell voltage increased from 0.58 to 0.63 V. Curves 132 and 134 show the effect of increasing pressure from 0 to 20 psig at 50° C. At the current density of 300 mA/cm$^2$ the cell voltage increased from 0.63 to 0.68 V.

According to a further embodiment of the invention, about 16 mg of Nafion 117 in the dry state was deposited on each electrode of platinum loading 0.5 mg/cm$^2$. A Mylar ® film of thickness 100 μm having a central hole of 2.25 cm$^2$ was used in assembling the fuel cell. No humidification was provided to the cell. The fuel cell performance data were collected after a cell conditioning period of two days. The fuel cell performance at 30° C., 20 psig pressure and current density 300 mA/cm$^2$ was 0.67 V, and at 50° C. and the same pressure and current as above, the cell performance was 0.72 V.

The above embodiments are given by way of example and are not intended as limitations as further embodiments and advances will occur to those of skill in the art which practice the present invention.

I claim:

1. A fuel cell, comprising:
   a first electrode having a surface;
   a second electrode having a surface opposing said first electrode surface;
   an electrolyte member located between and in contact with said opposing surfaces of said first and second electrodes;
   a non-conducting film having a central hole, said non-conducting film positioned between said first and second electrodes and contacting the outer periphery of said opposing surfaces of said first and second electrodes, and wherein said central hole surrounds and contacts said electrolyte member;
   a fuel distribution member for supplying fuel to said first electrode; and
   an oxidant distribution member for supplying oxidant to said second electrode.

2. The fuel cell according to claim 1, wherein said fuel distribution member is in flow communication with said first electrode and wherein said oxidant distribution member is in flow communication with said second electrode.

3. The fuel cell according to claim 1, wherein said fuel distribution member supplies a gaseous fuel to said first electrode and wherein said oxidant distribution member supplies a gaseous oxidant to said second electrode.

4. A fuel cell for generating electricity from a reaction between a fuel source and an oxidant source, said fuel cell comprising:
   a first porous gas diffusion electrode having a surface;
   a second porous gas diffusion electrode having a surface opposing said first electrode surface, said second electrode defining an electric field with said first electrode;
   a catalyst layer lining said surfaces of said first and second electrodes;
   a first electrolyte deposit placed on the center portion of said first electrode surface leaving the outer periphery of said first electrode surface exposed;
   a second electrolyte deposit placed on the center portion of said second electrode surface leaving the outer periphery of said second electrode surface exposed; and
   a non-conducting film having a central hole, wherein said non-conducting film is positioned between and in contact with said exposed surfaces of said first and second electrodes, wherein said hole surrounds and contacts said first and second electrolyte deposits and wherein said first and second electrolyte deposits are in contact with each other.

5. The fuel cell according to claim 4, wherein said non-conducting film is bonded to said first and second electrodes and said catalyst layers.

6. The fuel cell according to claim 4, wherein said first and second electrolyte deposits each comprise a perfluorocarbon copolymer proton conducting material.

7. The fuel cell according to claim 6, wherein said first and second electrolyte deposits in the dry state is between about 10 to about 20 mg per 5 cm$^2$ electrode area of a 5% concentrated solution of a perfluorocarbon copolymer proton conducting material.

8. The fuel cell according to claim 4, wherein said first and second electrolyte deposits comprise a mixture of at least two perfluorocarbon copolymer proton conducting materials.

9. The fuel cell according to claim 4, wherein said non-conducting film is a polypropylene film.

10. The fuel cell according to claim 4, wherein said non-conducting film is a Mylar ® film.

11. The fuel cell according to claim 4, wherein said catalyst layers are platinum.

12. A fuel cell for generating electricity from a reaction between a fuel source and an oxidant source, said fuel cell comprising:
   a first porous gas diffusion electrode;
   a second porous gas diffusion electrode, said second electrode defining an electric field with said first electrode;
   a first electrolyte deposit placed on said first electrode;
   a second electrolyte deposit placed on said second electrode; and an electrolyte membrane positioned between and in contact with said first and second electrolyte deposits, wherein said electrolyte membrane has an equivalent weight and thickness to allow significant transfer of protons between said first and second electrodes.

13. The fuel cell according to claim 12, wherein said first and second electrolyte deposits comprise a perfluorocarbon copolymer proton conducting material.

14. The fuel cell according to claim 12, wherein said first and second electrolyte deposits comprise a mixture of at least two perfluorocarbon copolymer proton conducting materials.

15. The fuel cell according to claim 12, wherein said first and second electrolyte deposits in the dry state is a 5% concentrated solution of a perfluorocarbon proton conducting material from about 1 to about 6 mg per 5 $cm^2$ electrode area.

16. The fuel cell according to claim 12, wherein said electrolyte membrane is a perfluorocarbon proton conducting material.

17. The fuel cell according to claim 12, wherein said electrolyte membrane has an equivalent weight of about 1,000 grams or less.

18. The fuel cell according to claim 17, wherein said electrolyte membrane has a thickness of about 125 µm or less.

19. The fuel cell according to claim 12, wherein said electrolyte membrane is thin and has a high equivalent weight.

20. The fuel cell according to claim 19, wherein said electrolyte membrane has an equivalent weight of about 1100 grams and a thickness of about 50 µm or less.

* * * * *